(12) United States Patent
Delany et al.

(10) Patent No.: US 11,586,878 B1
(45) Date of Patent: Feb. 21, 2023

(54) METHODS AND SYSTEMS FOR CASCADING MODEL ARCHITECTURE FOR PROVIDING INFORMATION ON REPLY EMAILS

(71) Applicant: SALESLOFT, INC., Atlanta, GA (US)

(72) Inventors: Alec Lionel Delany, Atlanta, GA (US); Carlos Roman Salas, Long Beach, CA (US); Sneha Dey Subramanian, Atlanta, GA (US); Scott Hood Mitchell, Smyrna, GA (US); Michel Guillet, Alpharetta, GA (US)

(73) Assignee: SALESLOFT, INC., Atlanta, GA (US)

( * ) Notice: Subject to any disclaimer, the term of this patent is extended or adjusted under 35 U.S.C. 154(b) by 0 days.

(21) Appl. No.: 17/548,253

(22) Filed: Dec. 10, 2021

(51) Int. Cl.
| | |
|---|---|
| H04L 51/00 | (2022.01) |
| G06F 40/166 | (2020.01) |
| G06F 40/58 | (2020.01) |
| G06F 40/279 | (2020.01) |
| G06N 3/04 | (2023.01) |
| G06N 3/08 | (2023.01) |

(52) U.S. Cl.
CPC .......... *G06N 3/0454* (2013.01); *G06F 40/166* (2020.01); *G06F 40/279* (2020.01); *G06F 40/58* (2020.01); *G06N 3/08* (2013.01); *H04L 51/00* (2013.01); *G06F 2207/4824* (2013.01)

(58) Field of Classification Search
CPC ...... G06N 3/0454; G06N 3/08; G06F 40/279; G06F 40/166; G06F 40/58; H04L 5/00
See application file for complete search history.

(56) References Cited

U.S. PATENT DOCUMENTS 7,760,865 B2  7/2010  Awan et al.
8,064,342 B2  11/2011  Badger
(Continued)

OTHER PUBLICATIONS

U.S. Appl. No. 15/852,259, filed Dec. 22, 2017, Pending.
(Continued)

*Primary Examiner* — Kevin Ky
(74) *Attorney, Agent, or Firm* — Vorys, Sater, Seymour and Pease LLP

(57) ABSTRACT

Methods and systems for a cascading model architecture for providing information on a reply email. Training sample data can be created using a user's incoming reply emails from external computer devices to a user's computer device. A receptivity neural network model can be trained using the training sample data of the reply emails, and a trained receptivity neural network model can be used to determine a receptivity classification for whether new reply emails are positive reply emails or non-positive reply emails. Sample data of non-positive reply emails can be augmented, and an objection identification neural network model can be trained on the augmented sample data of the non-positive reply emails. A trained objection identification neural network model can be used to determine a objection classification for new non-positive reply emails. Explainability information for a classified reply email can be determined to provide information key words and/or key phrases that were used by the trained receptivity neural network model and the trained objection identification neural network model to classify new positive reply emails and new non-positive reply emails.

44 Claims, 11 Drawing Sheets

Cascading Model Pipeline: Training Receptivity Model

(56) References Cited

U.S. PATENT DOCUMENTS

| | | | |
|---|---|---|---|
| 8,064,582 B2 | 11/2011 | Ma et al. | |
| 8,631,069 B2 | 1/2014 | Maes | |
| 9,256,695 B1 | 2/2016 | Willis et al. | |
| 9,392,122 B2 | 7/2016 | Sall | |
| 9,699,409 B1 | 7/2017 | Reshef et al. | |
| 9,992,448 B2 | 6/2018 | Reshef et al. | |
| 10,181,106 B2 | 1/2019 | Borodow et al. | |
| 10,187,439 B2 | 1/2019 | Ananthanarayanan et al. | |
| 10,218,839 B2 | 2/2019 | Gupta et al. | |
| 10,325,284 B1 | 6/2019 | Aggarwal et al. | |
| 10,468,051 B2 | 11/2019 | Godewyn et al. | |
| 10,630,631 B1* | 4/2020 | Yague | H04L 51/212 |
| 10,791,217 B1 | 9/2020 | Bussey | |
| 11,049,510 B1* | 6/2021 | Wong | G10L 15/26 |
| 11,138,269 B1* | 10/2021 | Sanders | G06F 16/2468 |
| 2003/0084107 A1* | 5/2003 | Covey | H04L 9/40 709/206 |
| 2007/0206759 A1 | 9/2007 | Boyanovsky | |
| 2009/0064323 A1* | 3/2009 | Lin | H04L 63/123 726/22 |
| 2009/0209236 A1 | 8/2009 | Bloebaum et al. | |
| 2009/0274284 A1 | 11/2009 | Arsenault et al. | |
| 2010/0135477 A1 | 6/2010 | Chen | |
| 2010/0205543 A1 | 8/2010 | Von Werther et al. | |
| 2010/0223389 A1 | 9/2010 | Ananthanarayanan et al. | |
| 2010/0296417 A1 | 11/2010 | Steiner | |
| 2011/0055379 A1* | 3/2011 | Lin | G06V 20/30 703/2 |
| 2011/0228921 A1 | 9/2011 | Singh et al. | |
| 2011/0271210 A1 | 11/2011 | Jones et al. | |
| 2012/0051267 A1 | 3/2012 | Ma et al. | |
| 2012/0137367 A1 | 5/2012 | Dupont et al. | |
| 2013/0076853 A1 | 3/2013 | Diao | |
| 2013/0191719 A1 | 7/2013 | Underhill et al. | |
| 2014/0006611 A1 | 1/2014 | Perez | |
| 2015/0036810 A1 | 2/2015 | Rashid et al. | |
| 2015/0149540 A1 | 5/2015 | Barker et al. | |
| 2016/0072862 A1 | 3/2016 | Bader-Natal et al. | |
| 2016/0212269 A1 | 7/2016 | Backhaus | |
| 2016/0253314 A1 | 9/2016 | Pottier et al. | |
| 2016/0381215 A1 | 12/2016 | Goyal et al. | |
| 2017/0223069 A1 | 8/2017 | Arora et al. | |
| 2017/0257598 A1 | 9/2017 | Reshef et al. | |
| 2017/0345325 A1 | 11/2017 | Metts | |
| 2017/0366621 A1 | 12/2017 | Sagar et al. | |
| 2018/0013891 A1 | 1/2018 | Charlson | |
| 2018/0082208 A1 | 3/2018 | Comier et al. | |
| 2018/0097841 A1 | 4/2018 | Stolarz et al. | |
| 2018/0121828 A1 | 5/2018 | Keysers et al. | |
| 2018/0176661 A1 | 6/2018 | Varndell et al. | |
| 2018/0191660 A1 | 7/2018 | Tene et al. | |
| 2018/0191901 A1 | 7/2018 | Aleksin et al. | |
| 2018/0191907 A1 | 7/2018 | Herrin et al. | |
| 2018/0227339 A1 | 8/2018 | Rodriguez et al. | |
| 2018/0232705 A1 | 8/2018 | Baker et al. | |
| 2018/0239822 A1 | 8/2018 | Reshef et al. | |
| 2018/0249007 A1 | 8/2018 | Seward et al. | |
| 2018/0249122 A1 | 8/2018 | Reshef et al. | |
| 2018/0253215 A1 | 9/2018 | Powell | |
| 2018/0268318 A1 | 9/2018 | Matam et al. | |
| 2018/0330736 A1 | 11/2018 | Faulkner et al. | |
| 2019/0042086 A1 | 2/2019 | White et al. | |
| 2019/0050376 A1 | 2/2019 | Krebs et al. | |
| 2019/0068390 A1 | 2/2019 | Gross et al. | |
| 2019/0068526 A1 | 2/2019 | Xie et al. | |
| 2019/0102846 A1 | 4/2019 | Loschiavo | |
| 2019/0132265 A1 | 5/2019 | Nowak-Przygodzki et al. | |
| 2019/0147042 A1 | 5/2019 | Raghavan et al. | |
| 2019/0182183 A1 | 6/2019 | Hubauer et al. | |
| 2019/0189117 A1 | 6/2019 | Kumar | |
| 2019/0205772 A1 | 7/2019 | Kohlmeier et al. | |
| 2019/0238354 A1 | 8/2019 | Wiener et al. | |
| 2019/0318743 A1 | 10/2019 | Reshef et al. | |
| 2019/0341050 A1 | 11/2019 | Diamant et al. | |
| 2019/0341054 A1 | 11/2019 | Krupka et al. | |
| 2019/0384813 A1 | 12/2019 | Mahmoud | |
| 2019/0392395 A1 | 12/2019 | Valliani | |
| 2020/0120083 A1* | 4/2020 | Kaladgi | G06F 21/604 |
| 2020/0311195 A1* | 10/2020 | Mishra | G06F 40/151 |
| 2020/0344183 A1* | 10/2020 | Mummidi | G06N 20/00 |
| 2020/0401716 A1* | 12/2020 | Yan | G06F 21/6218 |
| 2021/0003697 A1* | 1/2021 | Zhai | G06K 9/6256 |
| 2021/0019739 A1* | 1/2021 | Almonte | G06Q 20/0652 |
| 2021/0021603 A1* | 1/2021 | Gibbons | G06F 16/221 |
| 2021/0117868 A1* | 4/2021 | Sriharsha | G06F 16/901 |
| 2021/0142180 A1* | 5/2021 | Smith | G06N 3/0472 |
| 2021/0157768 A1* | 5/2021 | Silverstein | G06F 16/9035 |
| 2021/0200612 A1* | 7/2021 | Martyanov | G06F 40/279 |
| 2021/0201003 A1* | 7/2021 | Banerjee | G06V 40/169 |
| 2021/0211447 A1* | 7/2021 | Albero | G06N 3/08 |
| 2021/0233080 A1* | 7/2021 | Shekhar | G06Q 30/0601 |
| 2021/0234813 A1* | 7/2021 | Narayan | G06F 40/30 |
| 2021/0266345 A1* | 8/2021 | Chen | H04L 63/1425 |
| 2021/0303996 A1* | 9/2021 | Chen | G06N 3/0454 |
| 2021/0304204 A1* | 9/2021 | Ramesh | G06N 20/00 |
| 2021/0312260 A1* | 10/2021 | Wu | G06N 3/084 |
| 2021/0312395 A1* | 10/2021 | Harsham | G06N 3/0454 |
| 2021/0339759 A1* | 11/2021 | Fouad | G06V 10/764 |
| 2022/0067309 A1* | 3/2022 | Sellam | G06F 40/30 |

OTHER PUBLICATIONS

U.S. Appl. No. 16/558,692, Sep. 3, 2019, U.S. Pat. No. 10,791,217.
U.S. Appl. No. 16/518,367, filed Jul. 22, 2019, U.S. Pat. No. 11,115,624.
U.S. Appl. No. 16/524,653, filed Jul. 29, 2019, U.S. Pat. No. 10,742,695.
U.S. Appl. No. 16/855,610, US 2020-0252442, filed Aug. 6, 2020, Pending.
U.S. Appl. No. 16/897,846, US 2021-0067626, filed Mar. 4, 2021, Pending
U.S. Appl. No. 17/206,916, US 2021-0211609, filed Jul. 8, 2021, Pending.
WebEx Meeting Center with Collaboration Meeting Rooms (CMR Cloud) User Guide, https://www.cisco.com/c/en/us/td/docs/collaboration/meeting_center/wbs2913/CMR_Cloud_User_Guide.pdf, total 24 pages, Publication Date: Aug. 1, 2014.
Pexip Mobile App for Android Quick Guide https://docs.pexip.eom/files/v8/Pexip_Mobile_App_Android_Quickguide_v8.a.pdf, Total 4 pages, Publication Date: Feb. 2015.
Lync conference invitations in SIP terms http://blog.greenl.ee/2011/12/15/lync-conference-invitations/, Total 7 pages, Publication Date: Dec. 15, 2011.
RFC4579—Session Initiation Protocol (SIP) Call Control—Conferencing for User Agents, https://datatracker.ietf.org/doc/rfc4579/, pp. 3, Publication Date: Aug. 2006.
U.S. Appl. No. 17/206,916.
U.S. Appl. No. 17/845,857.
U.S. Appl. No. 15/852,259.
U.S. Appl. No. 16/855,610.
U.S. Appl. No. 16/897,846.

* cited by examiner

FIGURE 4: Receptivity Model Architecture

FIGURE 5: Objection Identification Architecture

METHODS AND SYSTEMS FOR CASCADING MODEL ARCHITECTURE FOR PROVIDING INFORMATION ON REPLY EMAILS

DETAILED DESCRIPTION OF ASPECTS OF THE DISCLOSURE

In some aspects of the disclosure, a model can classify an email reply (e.g., from a prospect to a seller) based on how receptive the prospect is to the seller's outreach. This can be similar to purchase intent, but can also be specific to outbound sales because we may be evaluating the prospect's willingness to continue discussions rather than their probability of purchasing. The model can classify the email replies into one of five categories:
1. Positive
2. Objection—Timing
3. Objection—Not the Buyer
4. Objection—No Interest
5. Other/Unsure With the exception of Other/Unsure, each label can also have an associated confidence rating to indicate how likely the model is to be correct about the predicted label. This rating can assist users in understanding the pitfalls and nuances of the model outputs.

The model can be made up of other models set up in a cascading fashion. A first model can detect if the reply is Positive or Not Positive, and any reply labeled as Not Positive can then be sent to a second model which aims to classify what Objection exists within the response. A purpose of these cascading models can be to be more accurate and more precise about the Positive replies because these can be valuable replies to sellers. In this document, we will refer to the first model as the Receptivity model, the second model as the Objection model, and the overall architecture as the Master model. Due to the limited amount of labeled data for the Objection model, we can utilize a novel generative text approach to data augmentation to supplement our sample size. We can also have an explainability model which can clarify why the model classified a reply. This can help build a user's trust in the model.

The cascading model approach, the generative data augmentation, or the explainability methodology, or any combination thereof, can help evaluate the body of an email reply as a signal of the prospect's receptivity to engage with a seller in moving a deal forward.

The email reply sentiment cascading model architecture can solve one or more of the following technical problems:

Can provide a new automated interface that does not require users to manually drill down through many layers to get to desired data or functionality (prior art interfaces were slow and complex and prone to human errors).

Can provide a cascade model architecture, preprocessing steps, or augmentations, or any combination thereof, which can increase accuracy of classification of reply emails relative to some used in prior art (e.g., gained from).

Can increase robustness to limited data by applying data augmentation techniques that artificially increase sample sizes. Some prior art may require hand labeling such data which, for millions of emails, would either take a long time or be impossible.

Cascading Architecture

As mentioned above, we can use a cascading architecture for both training and inference.

Figure 1:
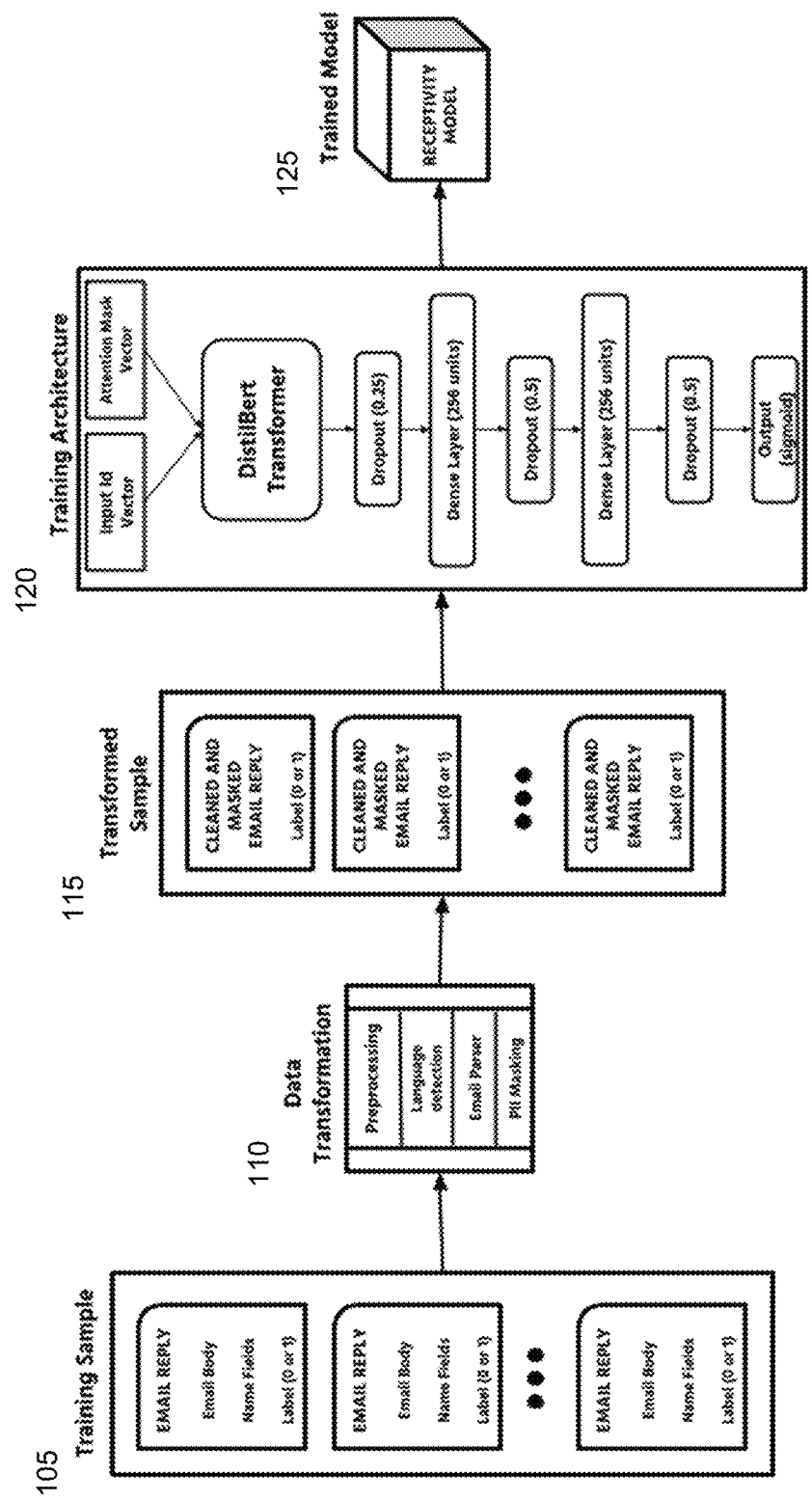
FIG. 1 illustrates a process for training a receptivity model, according to aspects of the disclosure.

For training, the cascading model architecture can have two parts. The first part can be training the Receptivity model. An example of this training is depicted in FIG. 1. FIG. 1 shows an example process of a set of training sample email replies (105) (which can be paired with the associated name fields and target variable) being transformed (110) by way of text preprocessing (removing .html, emojis, etc.), filtering out non-English email replies, removing security notices/disclaimers, or masking personally identifiable information (PII), or any combination thereof. These transformed samples and corresponding labels (115) can then be used to train the Receptivity model (120).

Figure 2:
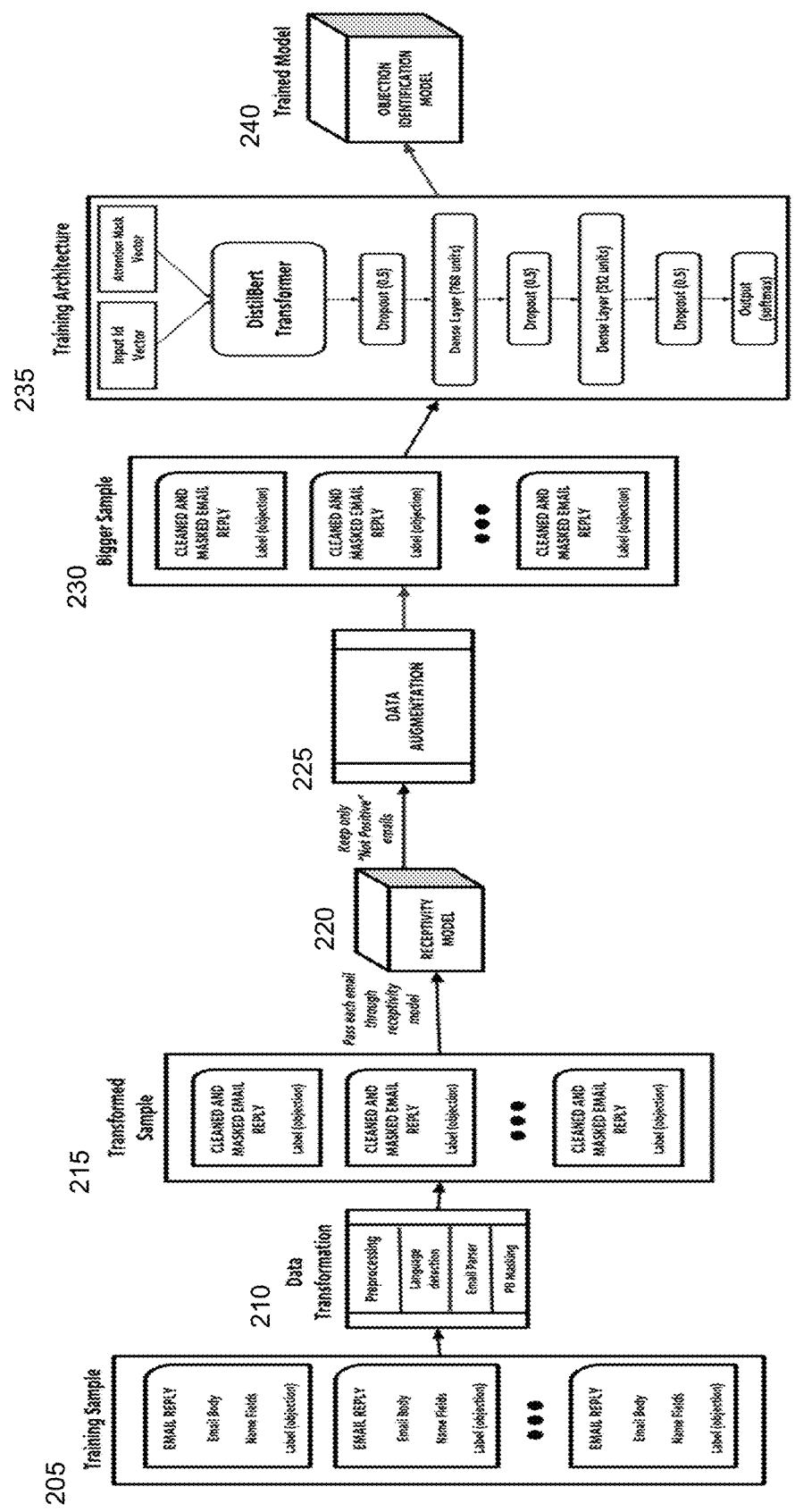
FIG. 2 illustrates a process for training an objection identification model, according to aspects of the disclosure.

Once we have a trained receptivity model, in the second part, we can train the Objection Identification model, as depicted in the example shown in FIG. 2. FIG. 2 shows an example process (which can be similar to FIG. 1) where a training set of email replies (205) (which can be paired with the associated name fields and target variable) being transformed by way of text preprocessing (210) (removing .html, emojis, etc.), filtering out non-English email replies, removing security notices/disclaimers, or masking personally identifiable information (PII), or any combination thereof. These transformed samples (215) can then be fed into the previously trained Receptivity model (220), after which only the samples labeled "Not Positive" can be kept. These filtered samples can then be fed into a one or more data augmentation models (225) to generate new samples with similar semantic meaning and corresponding labels. This larger sample set (230) can then be used as training architecture (235) for the Objection Identification model (240).

Figure 3:
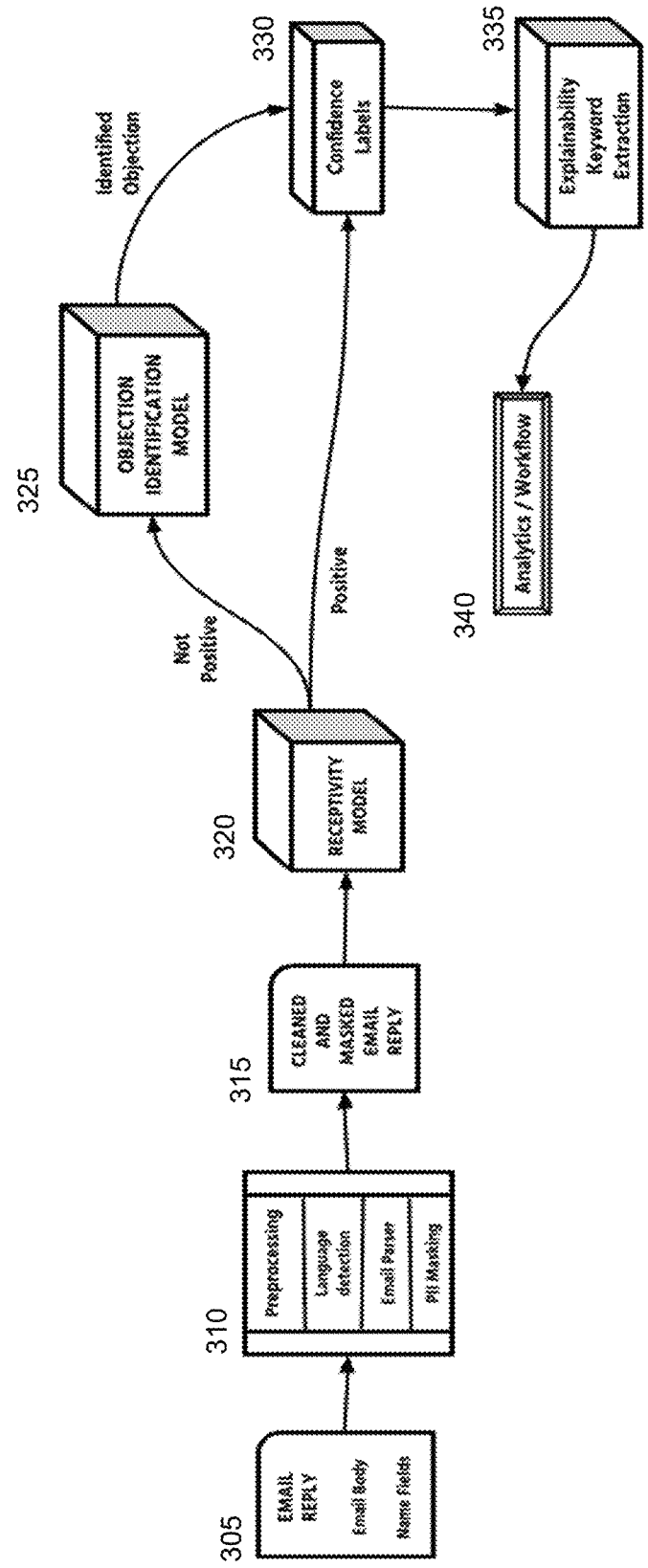
FIG. 3 illustrates an example process of using the Receptivity model and the Objection Identification model together, according to aspects of the disclosure.

For the inference pipeline, the Receptivity model and Objection Identification model can be used together as shown in the example of FIG. 3. FIG. 3 shows an example process of a new email reply (305) being processed (310) (which can be similar to the cleaning steps outlined in FIGS. 1 and 2), and the cleaned and masked new email reply (315) being fed into the trained receptivity model (320) for inference. If the model classifies the email reply as positive, then the prediction can be given a confidence label (330), can be matched with explainability keywords (335), and can be passed to analytics and the rest of the email workflow (340). If the receptivity model classifies the email reply as not-positive, then the email reply can be fed into the objection identification model (325) where the prediction from that model can be given a confidence label, matched with explainability keywords, and can then be passed to analytics and the rest of the email workflow. In summary, when a new email reply is fed into the inference pipeline, the final output can be a predicted label, a confidence score and an explainability output.

Each of these elements will be expanded upon in the subsequent sections of this document. See below for a code snippet of what the inference pipeline in the cascading model architecture looks like.

```
class CascadeModel:
    def_init_(self, recep_model_dir, oid_model_dir, tokenizer_dir):
        #load the trained receptivity model
        self.recep_model=load_model(recep_model_dir)
        #load the trained objection identification model
        self.oid_model=load_model(oid_model_dir)
        #load the tokenizer
        self.tokenizer=load_tokenizer(tokenizer_dir)
    #Objection identification model inference
    def predict_objection(self, text):
        #use the tokenizer to convert text into model input
        predict_input=self.tokenizer(text)
        #obtain objection identification model output
        output=self.oid_model(predict_input)
        #convert model input to predicted value and score
        prediction_value=output_to_label(output)
        score=max(output)
        return prediction_value, score
    #Receptivity model inference
    def predict(self, text):
        #use the tokenizer to convert text into model input
        predict_input=self.tokenizer(text)
        #obtain receptivity model score
        score=self.recep_model.predict(predict_input)
        #convert score to predicted value using thresholds
        if score>=upper threshold:
            prediction_value='Positive'
        elif score<=lower threshold:
            prediction_value, score=self.predict_objection(text)
        else:
            prediction_value='Other/Unsure'
        return prediction_value, score
```

Preprocessing

Creating the dataset for training each of the two models in the overall cascading model can require a significant amount of preprocessing before we can label the data and/or train the models. We can identify the language in each email using, for example (but not limited to) a Naive Bayesian filter. Open source language detection packages may be used, such as langdetect (https://pypi.org/project/langdetect/). Other filters can also be used, including, but not limited to: pycld2 (https://pypi.org/project/pycld2/) and spacy (https://spacy.io/universe/project/spacy-langdetect). Emails that are not in the singular focal language (e.g., English) for a specific implementation can be excluded from the training set.

We can extract only the body of the email reply, stripping out any preamble, signature, or other HTML that might exist in the text of the email in an effort to, for example, eliminate as much extraneous text from our samples as possible. This can be accomplished in the following way. First an open source library (such as, but not limited to: talon: https://github.com/mailgun/talon) may be used to remove the thread from the entire plaintext email reply. This thread removal method may be enhanced by looking for specific thread starter phrases within the reply and removing the part of the reply that begins with that specific phrase through the end of the email. Examples of starter phrases may include, but are not limited to: "Sent from my T-Mobile", "Sent from my iPad", etc.. At the end of this step, we can be left with only the most recent part of the sent message. Next, email preambles can be removed by first breaking the remainder part of the email reply into paragraphs and sentences (using, for example, but not limited to, sentence tokenizer in Python's nltk library: https://www.nltk.org/) and then by finding sentences that begin with any of a specific list of starter phrases that signify preambles. Examples of starter phrases may be "warning external sender", "use caution when opening attachments" and so on.

After the above steps, only an email with a body and signature may remain, so the next steps can separate the signature from the body of the email. To do this, a machine learning based approach may be used in the following manner. First, we can begin with a large sample of emails that only have bodies and signatures in them (that is, the preprocessing steps highlighted above have already been applied to this sample). Next, a heuristic signature removal technique may be implemented to apply several rule-of-thumb methods to separate signatures from the bodies. This may be done by first using an open source library (such as, but not limited to talon: https://github.com/mailgun/talon), and then enhancing the performance of this signature removal technique by looking for names (and nicknames, etc.) of the sender of the email within the text and assigning the part of the email starting from the location of the name (or nickname) as the signature. To find nicknames, an open source dictionary (such as, but not limited to, that contained in the following lookup table: https://github.com/carlton-northern/nickname-and-diminutive-names-lookup) may be used to map the name of the email sender to a nickname. If the name of the sender or a potential related nickname is not found in the email, initials of the name may also be searched for and if found, the part of the email starting from the location of the initial may be assigned as the signature. If the name of the sender is unavailable, the name may be parsed from the email address of the sender. This can be done by running through the email line-by-line and checking if any line can be compressed into and matched with the part of the sender email address that occurs before the @ sign. For example, if a line in the email is "John Smith", then this can be compressed into "johnsmith", "john.smith", "john_smith", "johns" and so on, which can help ensure that if the email address is "john.smith@company.org" there is an exact match with one of the compressed options. If such a line is found, that line can be assumed to contain the name of the sender and the part of the email starting from the location of the line may be assigned as the signature.

Once this heuristic signature removal method is in place, it can be used to label the signature lines as 1 and non-signature lines as 0 in a large sample of emails. These emails and their labels, together with various orthographic and lexicographic components of the lines in the emails as features, may be used to train a machine learning classifier model, such as Random Forests (for example, but not limited to, using Python's scikit-learn library for random forest classifiers, https://scikit-learn.org/stable/modules/generated/sklearn.ensemble.RandomForestClassifier.html). Examples of orthographic and lexicographic components are: how far down the start of the email the line occurs, whether the line contains an email address, whether it contains a phone number, whether it contains a signoff message (such as "Best regards,"), whether it contains the name of the sender, and so on (see, for example, https://www.cs.cmu.edu/~wcohen/postscript/email-2004.pdf). In case the name of the sender is unknown, a similar parsing method from the sender email address can be implemented as detailed above. Once a model has been trained, it can then be used to predict which lines in a new email are lines of the email's signature, which in turn can be used to derive only the body of the email.

We can also create a series of Personal Identifying Information (PII) Masks. The first mask can hide the names of the seller and/or the prospect in the body of the email replies. The Person PII mask can help avoid any unintended biases in the model based on assumed gender or ethnicity and/or can help avoid the model overfitting to certain specific names of prospects and/or sellers that may be more correlated with certain classification labels than others. This Person PII mask can work in two parts. The first can be a Named Entity Recognition (NER) mod& (such as, but not limited to, the open source spaCy implementation: https://spacy.io/api/entityrecognizer) that can help identify proper nouns that relate to a person's name. The second can be a simple string match between the existing data about both the seller and/or the prospect (specifically their first and last names) and the email reply content. For both parts, any words in the email reply body that might be personal names can be converted to a "[PERSON]" placeholder so that the model can still learn the context of an email that uses a person's name without learning the actual name. We can also create a PII mask to hide any phone numbers present in the email body. While this can be done more for privacy considerations than explicitly for model performance, it can serve to occlude potential contextually relevant information (e.g., regional tendencies) the model may pick up on. The phone number mask can be generated with NER model and/or RegEx string matches. As with the Person PII mask, phone numbers can be converted to a "[PHONE_NUM]" placeholder before being passed to the model. We can also create a mask for temporal information present in the email body. Strings denoting the days of the week (i.e., Monday, Tuesday, etc.) and months (i.e., January, February, etc.) can be detected by applying RegEx string matching and converted to a "[DayofWeek]" and "[Month]" placeholder. This can allow the model to learn the context of emails containing temporal information without biasing it for specific Day of week and/or Month combinations.

```
def preprocessing pipeline(raw_email_texts):
    #Parse the emails to separate email signatures and email reply bodies
    parsed_texts=parse_signature(raw_email_texts)
    #Run the regex cleaner to remove URLs etc.
    regexed_texts=regex_clean(parsed_texts)
    #Run the PII masking functions
    pii_masked_texts=strip_pii(regexed_texts)
    #Run the English filter cleaned_texts=is english(pii_masked_texts)
    return cleaned_texts
```

Receptivity Model

Figure 4:
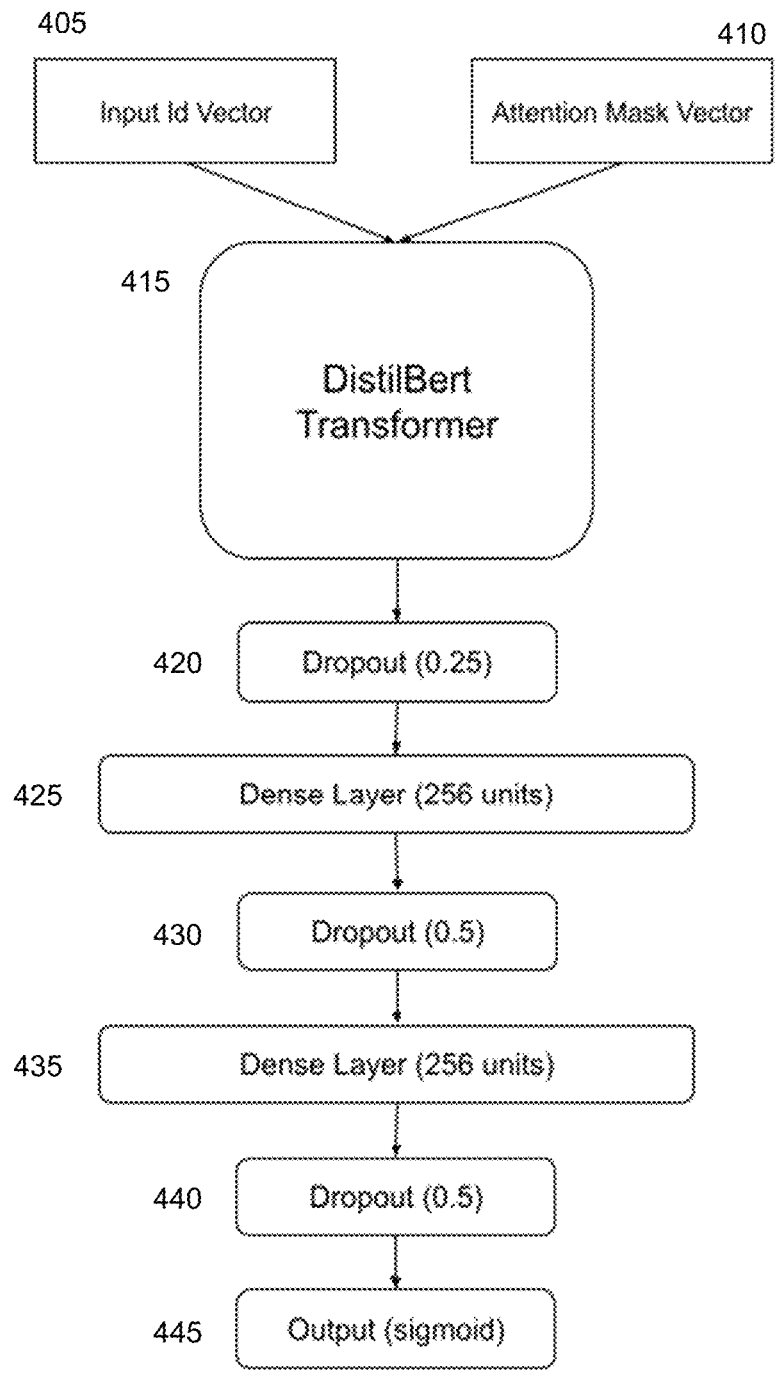
FIGS. 4-5 illustrate example Distilbert models and architecture, according to aspects of the disclosure.

The first stage of the master model can be the Receptivity Model, which can identify if the body of an email reply is Positive or Not Positive. Positive replies can be valuable to a seller so the model can focus on this label, allowing better performance for this class. This cascading approach to ensure specific performance for a certain class can be helpful. The model can begin as a transformer model (see, e.g., https://arxiv.org/pdf/1706.03762.pdf). For example, a base Distilbert model (see, e.g., https://arxiv.org/pdf/1910.01108.pdf) can be loaded from Hugging Face (https://huggingface.co/). As shown in FIG. 4, the training samples can be converted into input IDs and attention masks. These input IDs (405) and attention masks (415) can be passed as inputs to the Distilbert model (415), and can serve as outputs to a series of dropout and linear layers. In some aspects of the disclosure, the output from the Distilbert model can be passed through a dropout layer (420) with a 0.25 dropout rate, followed by a linear layer (425) that may contain 256 neurons, which may be followed by a subsequent dropout layer (430) with a dropout rate of 0.5 and another linear layer (435) with 256 neurons, which may again be followed by yet another dropout layer (440) with a dropout rate of 0.5, and may finally conclude in an output layer (445) with a sigmoid activation function. Those of ordinary skill in the art will see that many other numbers of neurons or linear layers or regularization methods can be used with the model. All layers of the base Distilbert model can be kept frozen during training. FIG. 4 illustrates an example of the model's architecture and data flow, according to an aspect of the disclosure. The deep neural network model can be trained for a given number of epochs (e.g., 3, 4, 19) necessary for the model to converge to a stable solution, where convergence is defined as reaching a point of diminishing returns wherein any further iterations/epochs no longer improves the model performance.

Many other types of transformer models may also be used, such as, but not limited to, BERT (https://arxiv.org/pdf/1810.04805.pdf#page=11&zoom=100,402,182)

ALBERT (https://arxiv.org/pdf/1909.11942.pdf)

ROBERTA (https://arxiv.org/pdf/1907.11692.pdf)

GPT-2 (https://d4mucfpksywv.cloudfront.net/better-language-models/language models are unsupervised multitask learners pdf)

etc

For the training data, the first response or first few responses from a prospect to a seller can be most indicative of the prospect's receptivity. This initial response(s) can be paired with labels for receptive or not receptive responses, but when such labels are unavailable, pseudo-labels indicating whether or not that prospect did convert from a prospect to a sales opportunity within the next thirty days can be used. If the prospect did convert to an opportunity then that email reply body can be deemed to be positive. This process can help provide us with a robust dataset for training the receptivity model.

Objection Identification

The second stage of our master model can be the objection identification model. This model can be fed any email reply body that was deemed Not Positive by the Receptivity model and can identify the objection, or why the email reply body was deemed Not Positive. With respect to sales language and processes, the identifiable objections can be Timing, Not the Buyer, No Interest, and a catch-all of Other/Unsure. This model was trained using hand-labeled data, which can be a very small sample size that may not provide enough information for our model to learn from. This data can be supplemented using generative data augmentation techniques outlined below. Once we have a sufficient sample size for our data, we can train the model.

Figure 5:
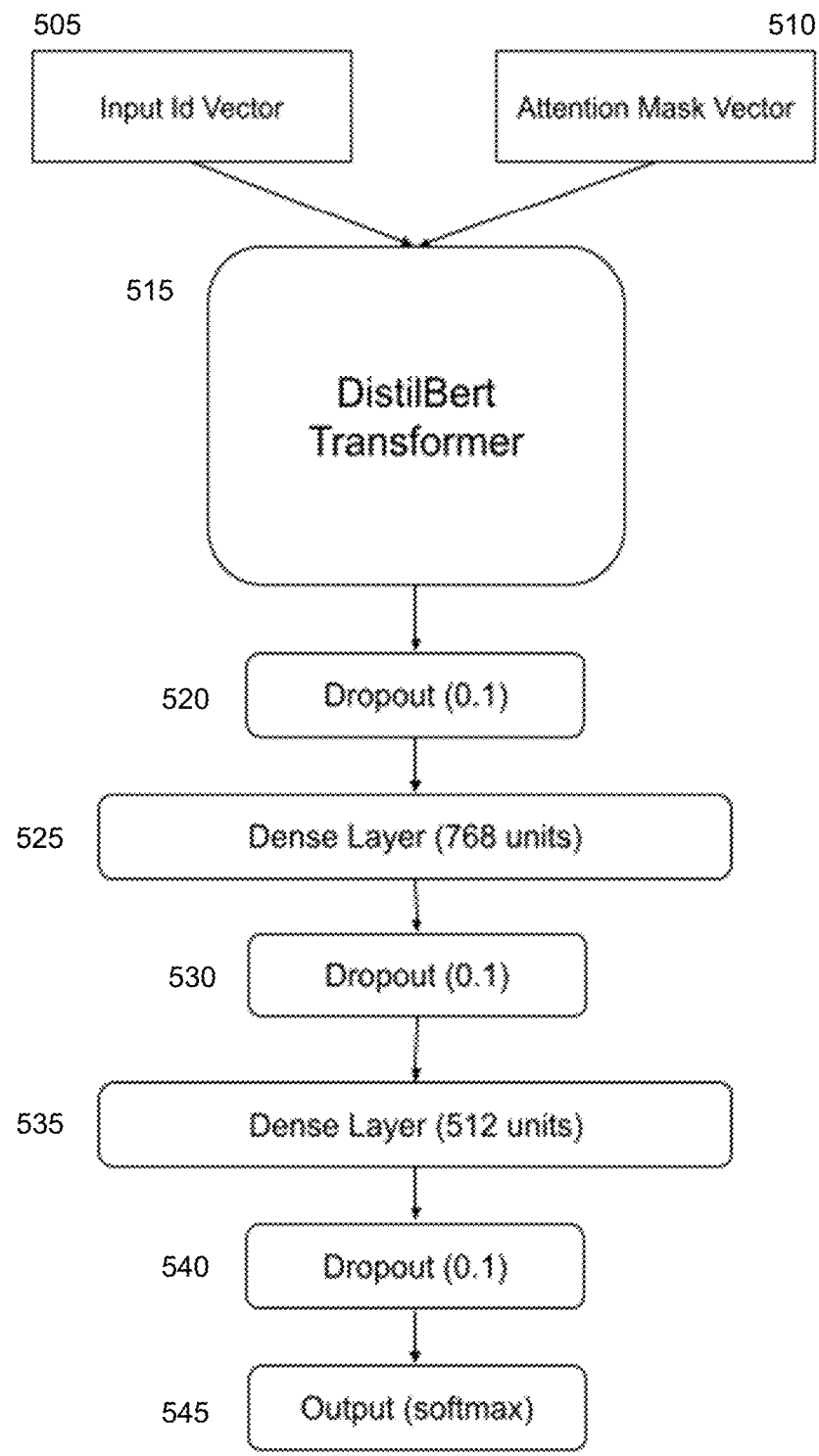

Much like the Receptivity model, the Objection ID model can begin as a base Distilbert transformer model loaded from Hugging Face. As shown in FIG. 5, the training samples can be converted into input IDs (505) and attention masks (510). These input IDs and attention masks can be passed as inputs to the Distilbert model (515), and can serve as outputs to a series of dropout and linear layers. In some aspects of the disclosure, the output from the Distilbert model can be passed through a dropout layer (520) with a 0.1 dropout rate, followed by two linear layers (525, 535) with corresponding dropout layers (530, 540), wherein the first linear layer can contain 768 neurons while a second linear layer can contain 512, and their respective dropout layers can have a dropout rate of 0.1. The output (545) of the last dropout layer can then be passed through an output layer with a softmax activation function for objection classification. Those of ordinary skill in the art will see that many other numbers of neurons or linear layers or regularization methods can be used with the model. As with the receptivity model, all layers of the base Distilbert model can be kept frozen during training. FIG. 5 is an example diagram of the model's architecture, according to an aspect of the disclosure.

The deep neural network model can be trained for a given number of epochs (e.g., 3, 5, 20) necessary for the model to converge to a stable solution, where convergence is defined as reaching a point of diminishing returns wherein any further iterations/epochs no longer improves the model performance.

Data Augmentation

While the receptivity model can rely on opportunity generation for labeling positive vs non-positive replies, the training data for the objective identification model can rely on a more time intensive process of hand-labeling. We can hand-label a set (e.g., 3000) of email body samples. This set can represent an insufficient sample size for the objection identification model to learn from. In order to augment this dataset, introduce syntactic variability, and reduce the risk of our model overfitting the data, we can leverage: a number of Transformers-based language algorithms including a paraphrasing model, models for formal-to-informal and informal-to-formal language translation, or a back-translation model, or any combination thereof. Each of these models can accept a hand-labeled email reply body as input and can generate as output two augmented email bodies and associated label pairings. This can allow us to augment our original objection identification training dataset (e.g., by 8× in some embodiments), though the max augmentation set multiplier may theoretically be higher.

The paraphrase generator, formal-to-informal, or informal-to-formal algorithms, or any combination thereof, can all be loaded from the Text-To-Text Transfer Transformer (T5) library (see, e.g., https://github.com/google-research/text-to-text-transfer-transformer). The architecture for these models can be based on an encoder decoder transformer pre-trained in a text-to-text denoising generative task. The paraphrase model can leverage a conditional text generation framework, whereas the formal-to-informal and informal-to-formal models can leverage a neural language style transfer framework based on a Seq2Seq transformer model architecture (see, e.g., https://simpletransformers.ai/docs/seq2seq-model). These models can transfer the sentence formality style between formal and informal variants. The back-translation approach can use the English/German and English/Russian models loaded from Hugging Face, which can leverage Facebook's big Transformer architecture as implemented in the FAIRSEQ toolkit (see, e.g., https://research.fb.com/wp-content/uploads/2019/05/FAIRSEQ-A-Fast-Extensible-Toolkit-for-Sequence-Modeling.pdf). For this augmentation method, we can take the original English email body input, translate it to either German or Russian, and then back-translate the output into English. All of these methods can yield augmentations that can express the semantic content of an original email body using different words and sentence structure. However, unlike the other methods, the backtranslation approach can generate only one email output variant per input email. The other methods here can generate any number of augmentations, although in some aspects of the disclosure, we can use two augmentations per method.

Some embodiments of the data augmentation can apply a number or combination of dimensionality reduction algorithms and cluster validation techniques (e.g., Silhouette Coefficients) to the augmented email body embeddings in order to ascertain that the projected latent space representations for the augmented email samples are statistically indistinguishable from those of the original email bodies. These dimensionality reduction algorithms may include, but are not limited to:

Uniform Manifold Approximation and Projection (UMAP):
    https://arxiv.org/abs/1802.03426
    https://github.com/lmcinnes/umap
Pairwise Controlled Manifold Approximation (PACMAP):
    https://arxiv.org/abs/2012.04456
    https://github.com/YingfanWang/PaCMAP
Isometric Mapping (ISOMAP):
    https://www.science.org/doi/10.1126/science.290.5500.2319
    https://github.com/scikit-learn/scikit-learn/blob/0d378913b/sklearn/manifold/isomap.py#L21
Silhouette Coefficients:
    https://www.sciencedirect.com/science/article/pii/0377042787901257
    https://github.com/scikit-learn/scikit-learn/blob/0d378913b/sklearn/metrics/clusterLunsupervised.py#L39

Below is an example of how data augmentation can work. Here is a sample cleaned and masked email reply:

Original: "hi [PERSON], funny you reached out, we were planning to begin evaluating your software. I'm available next thursday at 3 PM"

The following are examples of the original email passed through the various augmentation methods.

Paraphrase: "hello, it's good you emailed. are you available next thursday at 3 pm? we were about to start evaluating your software."

Formal to Casual: "hi [PERSON], funny you guys reached out. we were about to evaluate ur software. You free next thurs at 3 pm?"

Casual to Formal: "hello [PERSON], great that you reached out. We were going to commence your software evaluation. I will be available the following thursday at 3 pm."

Back-translation: "hello [PERSON], funny that you reached out. We planned to evaluate your software. I will be free next thursday at 3 pm."

Confidence Labels

Evaluating a model's confidence in a prediction can be more complicated for a categorical prediction than a continuous prediction, and can be even more difficult to translate to a user with no machine learning background. To provide the user with a sense of "confidence" without getting into actual confidence intervals, we can feed our master model a holdout set of labeled samples (e.g., email body replies) and we can analyze the relationship between the range of output probabilities (e.g., these probabilities can be the result of either a softmax function for objection labels or a sigmoid function for Positive labels) and the overall precision accuracy for that label. We can choose upper (i.e., 'strong' to 'moderate') and lower (i.e., 'moderate' to 'unsure') probability thresholds for each label. For example, this can correspond to 80% precision and 65% precision for objections and 90% and 80% precision for Positive labels. Those of ordinary skill in the art can see that many other threshold values can be used in other aspects of the disclosure.

The code snippet below can be used to define a function that maps the sigmoid (Receptivity model) or softmax (Objection Identification model) probability into either strong, moderate, and unsure labels.

```
def get_confidence_label(predicted_label, predicted_score, upper_threshold, lower_threshold):
    if predicted_score>=upper_threshold:
        confidence_label='strong'
    elif predicted_score<upper_threshold and predicted_score>=lower_threshold:
        confidence_label='moderate'
    elif predicted_score<lower_threshold:
        confidence_label='unsure'
    return confidence_label
```

Explainability

Once the master model has made a prediction and we have assigned a corresponding confidence label, we may want users to have insight into why the master model made the prediction that it made. The field of Explainable AI can be used but may have limitations. Feature Attribution methods can require too much computational power and run time to be efficient in a platform, and gradient-based approaches can require us to retrain both the Receptivity model and the Objection Identification model in a manner that can allow for differentiability of the output with respect to the input when the input is discrete. To avoid these pitfalls, we can use an explainability algorithm that avoids the inner-mechanisms of the master model and its submodels and does not require multiple iterations like Feature Attribution models. Our explainability model can be akin to feature engineering but after the fact. The aim of this model can be to identify a large list of the most common keywords and phrases within samples that have been predicted to be in the same class and can then highlight these keywords and phrases when they appear in the email reply body for a user. For example, our model can recognize the keyword "unsubscribe" as being indicative of the Objection—No Interest label and can indicate such information to a user whose email reply body has been labeled Objection—No Interest and contains the word "unsubscribe". Similarly, the phrase "looking forward" can be indicative of a Positive label and this association can be made evident in a reply matching both of these conditions.

To identify these keywords and phrases, we can separate "core" clusters of samples per label from extraneous noise. These core clusters alone can represent intra-label themes that can be used for topic generation. We can identify the clusters and separate them from the noise by using a dimensionality reduction technique such as Uniform Manifold Approximation and Projection (e.g., UMAP; reference above), t-distributed Stochastic Neighbor Embedding (e.g., t-SNE; https://lvdmaaten.github.io/publications/papers/JMLR_2008.pdf), Isometric Mapping (ISOMAP; reference above), or Pairwise Controlled Manifold Approximation (e.g., PACMAP; reference above) which can aim to preserve local structure in lower-dimensional representations, and we can then apply a clustering algorithm such as Hierarchical Density Based Clustering (e.g., https://link.springer.com/chapter/10.1007/978-3-642-37456-2_14), or Ordering Points to Identify Cluster Structure (OPTICS; https://citeseerx.ist.psu.edu/viewdoc/download?doi=10.1.1.407.5572&rep=rep1&type=pdf), on the lower-dimensional projections which can help identify clusters and noise. Dimensionality reduction can be notoriously volatile based on hyperparameter selection, so we can repeat this process across many (e.g., 72) hyperparameter combinations and can only select the stable clusters that persist through multiple hyperparameter sets (e.g. converging on the core samples in each class).

These core clusters can tend to map to topics or themes found within the samples, and the keywords and phrases associated with these topics or themes can be identified using keyword extraction methods such as Rapid Automatic Keyword Extraction (RAKE; see e.g., https://citeseerx.ist.psu.edu/viewdoc/download?doi=10.1.1.657.8134&rep=rep1&type=pdf) or TopicRank (see e.g., https://aclanthology.org/I13-1062.pdf). Once these keywords and key phrases are identified for each topic within each label, simple string matching can allow us to notify the user when one of these phrases appears in their email reply body, which can offer them insight into what information the master model used to make its prediction.

Inference Example

Below is an example email through inference.

Here's an example email reply from a prospect:

"Hi Dan,
Funny you reached out, we were planning to begin evaluating your software. I'm available next Thursday at 3 PM.
Best,
Shawna Garcia
VP of Marketing
Market-Champ Inc."

To run the Preprocessing steps (removing signature, personal identifiable information etc.), we pass the above email into the following function:
cleaned_text=preprocessing_pipeline(raw_email_text)

The email can then get reduced to:
cleaned_text="hi [PERSON], funny you reached out, we were planning to begin evaluating your software. I'm available next [DayofWeek] at [Time]."

When this email is passed through the Cascade Architecture using the following function call:
predicted_label, predicted_score=CascadeModel.predict(cleaned_text),
the result can be labeled as "Positive" by the Receptivity Model within the Cascade Architecture. When passing this through the Confidence Labels algorithm using the function call:
confidence_labels=get_confidence_label(predicted_label, predicted_score, upper_threshold, lower_threshold),
a confidence of "Strong Confidence" can be returned.

Here's another example email reply:
"Hi Dan,
Not really interested in this right now, but we already have a solution in place.
Best,
Shawna Garcia
VP of Marketing
Market-Champ Inc."

To run the Preprocessing steps (removing signature, personal identifiable information etc.), we pass the above email into the following function:
cleaned_text=preprocessing_pipeline(raw_email_text)

The email can then get reduced to:
cleaned_text="hi [PERSON], not really interested in this right now, but we already have a solution in place."

When this processed email is passed through the Cascade Architecture using the following function call:
predicted_label, predicted_score=CascadeModel.predict (cleaned_text),
the intermediate result can be labeled as "Not Positive" by the Receptivity Model within the Cascade Architecture. Following the flow in the Cascade Architecture, the processed email can then be passed through the Objection Identification model, which can give the result "Objection—Timing". When passing this through the Confidence Labels algorithm using the function call:
confidence_labels=get_confidence_label(predicted_label, predicted_score, upper_threshold, lower_threshold),
it can return "Moderate Confidence".

Example User Interfaces

The Email Sentiment feature can automatically detect the sentiments associated with the incoming reply emails into a user's inbox. Incoming reply emails can be replies sent by, for example, prospective customers in response to an outgoing email sent by sellers that contain sales pitches for products or technologies that they're selling. Those of ordinary skill in the art will see that the methods and systems herein may be used to automatically detect the sentiments associated with many other types of reply emails, such as, but not limited to: customer support reply emails, account management reply emails.

From a sales person's perspective, the seller may want to understand how their sales messaging and strategies are performing so they can learn to adjust them or adopt better methods. From a manager's perspective, the manager may want to know which of the messaging and strategies employed by the team are performing the best so they can coach their team on best practices. The managers may also want to know the differences between the effort levels and performances of the various team members (e.g., for coaching purposes). Managers may also want to have this information over a long time period so they can gauge if the strategies and messaging the team currently employs is suddenly becoming ineffective.

In some prior art, the only way a sales person or a sales manager can do any of the tasks mentioned above is to either rely on inefficient metrics—like email open rate or email reply rate—or manually look through all their email replies one by one, manually record their perceived sentiment in a different system and then match these with the specific strategies and/or messaging. The former method of reliance on email open rate or reply rate may be ineffective because opens are becoming harder and harder to measure and may not really be indicative of how much the prospective customer cared about what they read, whereas replies may be quite often just "unsubscribes" or plain no's and that does not give the user much information depth. The latter method of looking through all email replies one by one is time consuming and could even be unrealistic since a single sales person may have thousands of reply emails in their inboxes, whereas a team can collectively have millions.

The Email Sentiment can solve both problems by automating the provision of more information on the type of reply and doing this at scale so the users do not have to manually sift through these emails one by one. In addition, it can surface high-level analytics that can help sales people and their leaders make decisions about their strategies and messaging. Note that, in each of the examples below, the only way to recreate these analytics may be to sift through all reply emails one by one, manually label each of them and use a different software to create high-level analytical insights from those manual labels.

Figure 6:
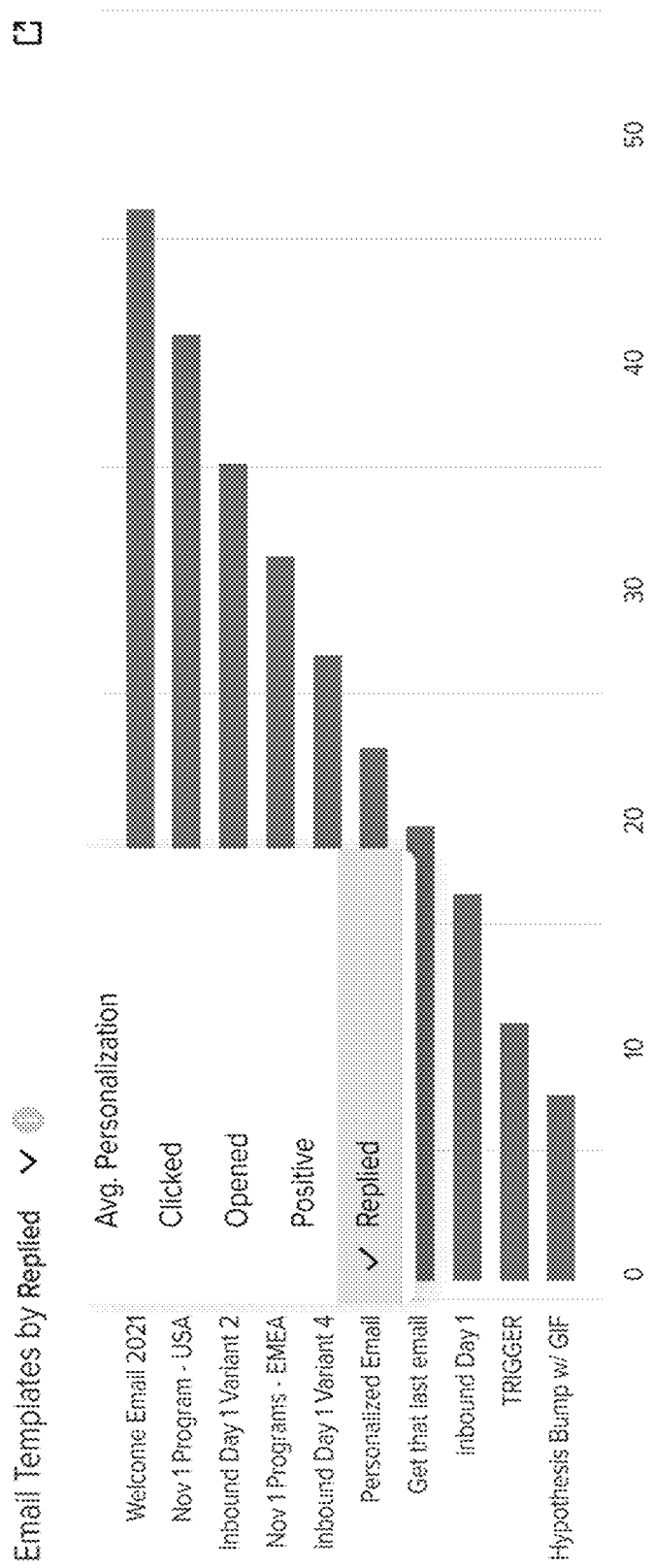
FIG. 6 illustrates an example application of the Email Sentiment within the product's analytics tab, according to aspects of the disclosure.

FIG. 6 shows an example application of the Email Sentiment within the product's analytics tab. The list on the left is a list of different email templates (i.e. sales messaging) being used by a team. By using the dropdown, a user on the team can now see how the different templates have performed historically with respect to percentage of positive replies, whereby the class positive can be automatically labeled by the email reply sentiment cascading architecture model.

Figure 7:
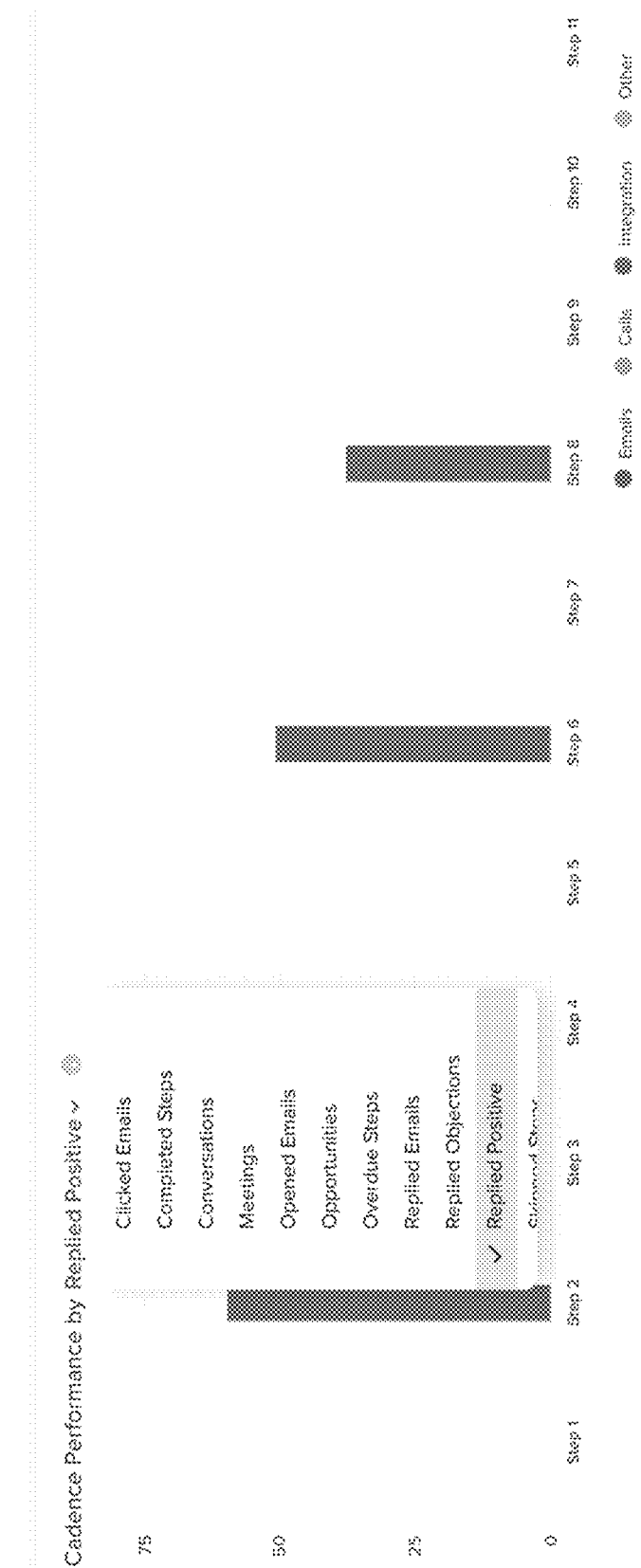
FIG. 7 illustrates an example application of the Email Sentiment within the product's analytics tab, according to aspects of the disclosure.

FIG. 7 shows an example application of the Email Sentiment within the product's analytics tab. Cadences can be used for defining a sales strategy. By using the dropdown, a user on the team can now see how the different steps in a given cadence have performed historically with respect to percentage of positive replies as well as percentage of objections, whereby both the classes positive and objection can be automatically labeled by the email reply sentiment cascading architecture model.

Figure 8:
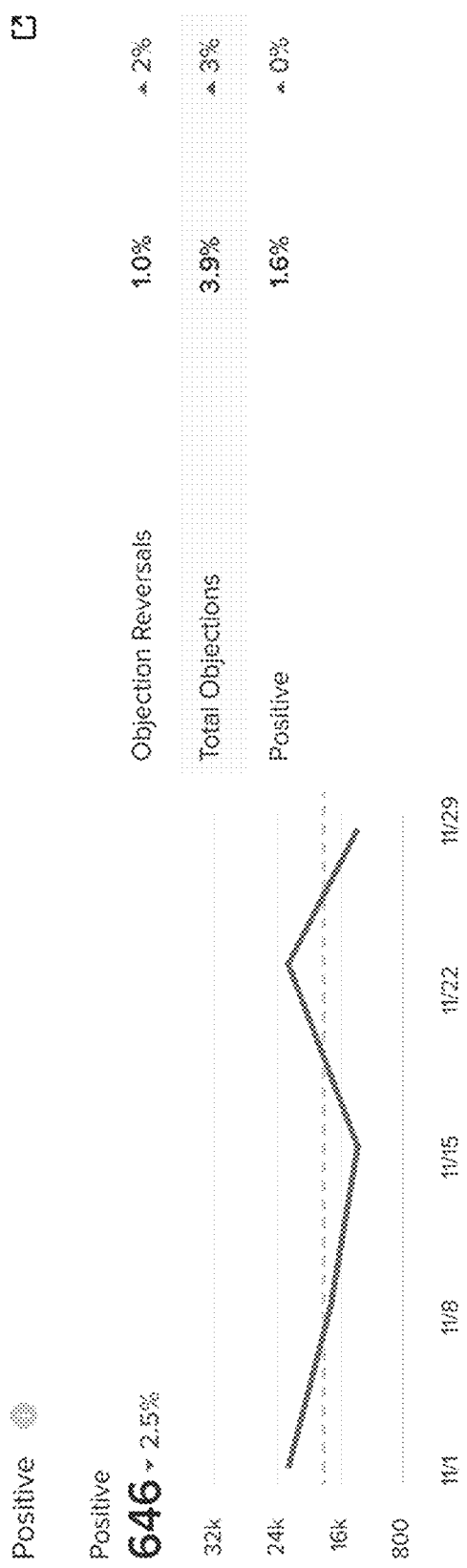
FIG. 8 illustrates an example application of the Email Sentiment within the product's analytics tab, according to aspects of the disclosure.

FIG. 8 shows an example application of the Email Sentiment within the product's analytics tab. On the left is a graph showing how a team's positive replies have been trending over the past month. On the right are some metrics showing how much percentage of the replies were objection reversals (e.g., a person who replied with an objection but later replied positively), total objections and positive. The classes positive and objection can be automatically labeled by the email reply sentiment cascading architecture model.

Figure 9:
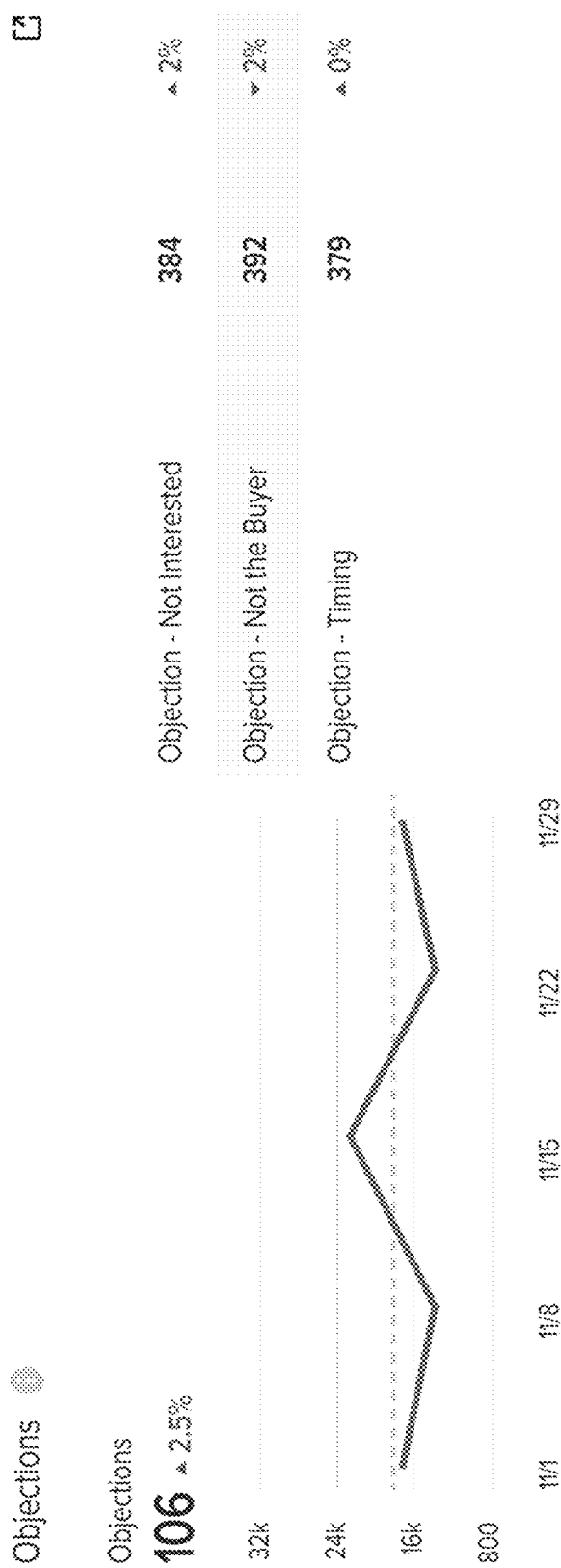
FIG. 9 illustrates an example application of the Email Sentiment within the product's analytics tab, according to aspects of the disclosure.

FIG. 9 shows an example application of the Email Sentiment within the product's analytics tab. On the left is a graph showing how a team's objection replies have been trending over the past month. On the right are some metrics showing how many replies were specific types of objections. The classes objection and the different types of objection can be automatically labeled by the email reply sentiment cascading architecture model.

Figure 10A:
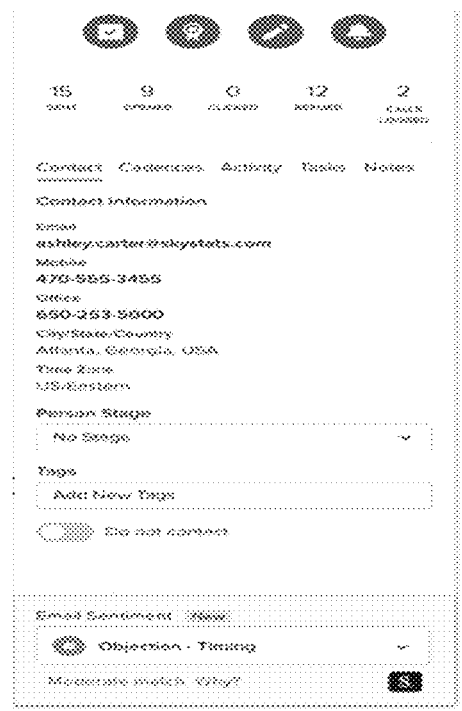
FIGS. 10A and 10B illustrate example applications of the Email Sentiment within the user interface, according to aspects of the disclosure
Figure 10B:
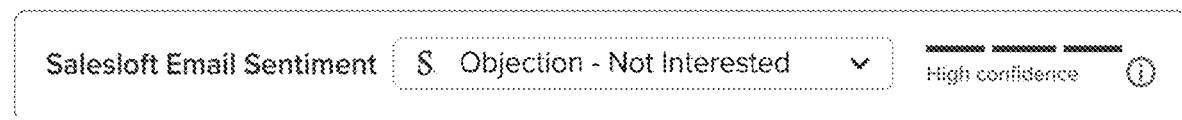

FIGS. 10A and 10B show example applications of the Email Sentiment within the user interface in the Outlook and Gmail clients, respectively. In each of the Outlook and Gmail images, an email reply has been automatically classified by the email reply sentiment cascading architecture model. In the first example, the model classified the email as 'Objection—Timing' with 'Moderate' model confidence. In the second example, the model classified the email as 'Objection—Not Interested with 'High' model confidence. Both those objection classes can be automatically labeled by the email reply sentiment cascading architecture model, and the confidence intervals can be labeled using an algorithm that maps confidence scores to confidence labels based on predetermined thresholds.

For a user using working through their email inboxes (such as, e.g., Gmail or Outlook), when a user opens an email reply, the interface may display a horizontal dropdown bar with the model's classification for that email reply. The user, if they so choose, may use the dropdown to change the model's classification of that email reply. Collecting the data from all users' model classification overwrites, an automated cascading model retraining architecture may be built. Such an architecture can be similar to the architecture described above in this application, except that the training sample may be a balanced sample of non-overwritten and overwritten email reply classifications across all users of the platform. This feedback loop can only be accomplished by a machine, since the number of users can be exceedingly large. For example, for one entity, we can have more than 100,000, which can grow very quickly. In addition, the training procedure in and of itself is very complex with millions of layers to be approximated to obtain convergence (described in more detail below).

Both the receptivity model and the objection identification model can be deep neural network models that can be trained for a given number of epochs (e.g., 3, 4, 19, 20) necessary for the models to converge to a stable solution, where convergence is defined as reaching a point of diminishing returns wherein any further iterations/epochs no longer improves the model performance. These steps of convergence may only be performed with the help of a computer as each epoch involves adjusting the weights in tens of millions of training parameters.

Example Computer System

Figure 11:
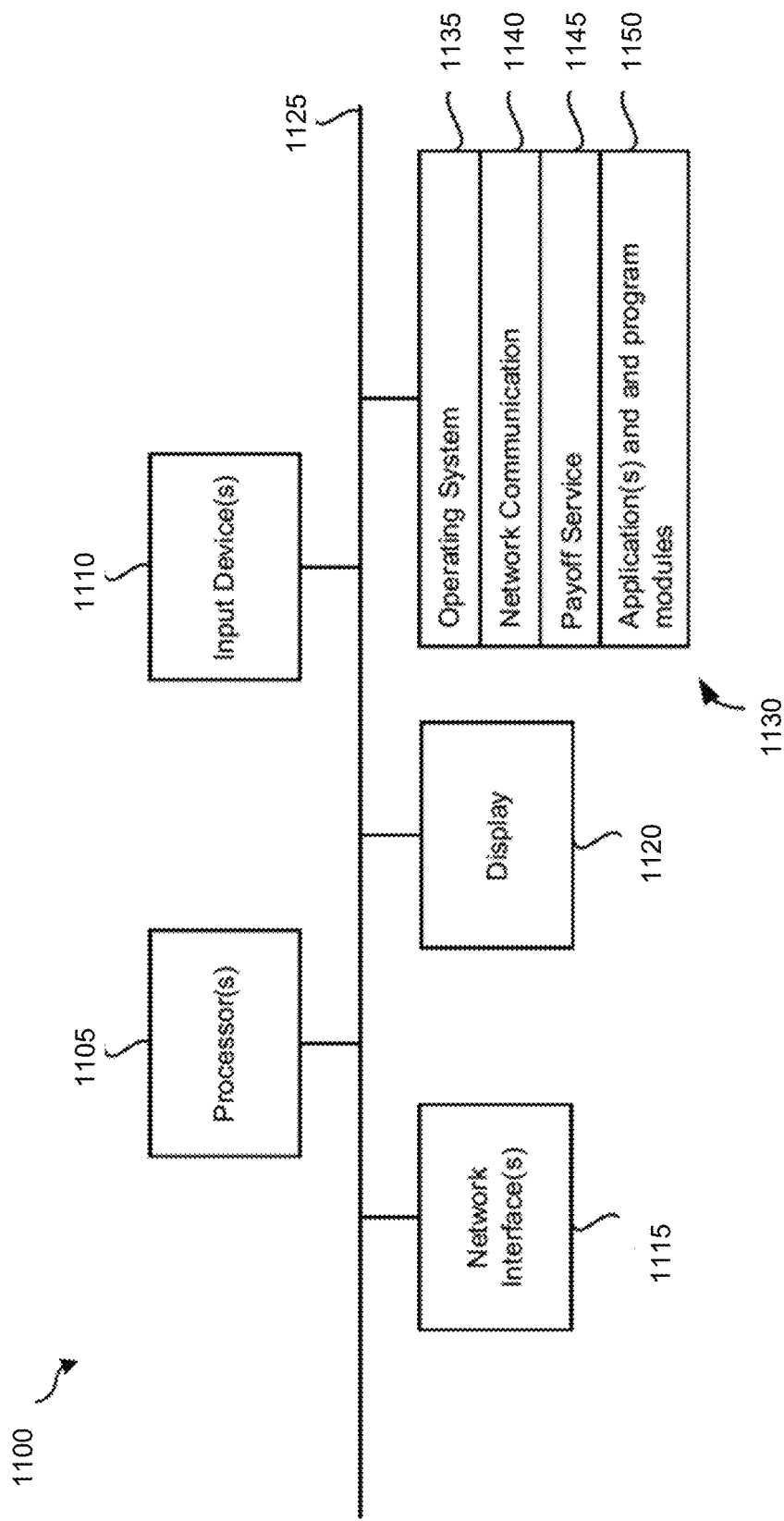
FIG. 11 is an example computer system, according to aspects of the disclosure.

FIG. 11 is a block diagram of an example computing device 1100 that may be utilized to execute embodiments to implement methods or processes including various features and functional operations as described herein. For example, computing device 1100 may function as server device and/or a user device or a portion or combination thereof. The computing device 700 may be implemented on any electronic device to execute software applications derived from program instructions, and may include, but is not limited to: personal computers, servers, smartphones, media players, electronic tablets, game consoles, email devices, etc. In some implementations, the computing device 700 may include one or more processors 1102, one or more input devices 1104, one or more display devices or output devices 1106, one or more communication interfaces 1108, and/or memory 1110. Each of these components may be coupled by bus 1112, or in the case of distributed computer systems, one or more of these components may be located remotely and accessed via a network.

Processor(s) 1102 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-transitory memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input devices 1104 may be any known input devices technology, including but not limited to a keyboard (including a virtual keyboard), mouse, track ball, and touch-sensitive pad or display. To provide for interaction with a user, the features and functional operations described in the disclosed embodiments may be implemented on a computer having a display device 1106 such as a CRT (cathode ray tube) or LCD (liquid crystal display) monitor for displaying information to the user and a keyboard and a pointing device such as a mouse or a trackball by which the user can provide input to the computer. Display device 1106 may be any known display technology, including but not limited to display devices using Liquid Crystal Display (LCD) or Light Emitting Diode (LED) technology.

Communication interfaces 1108 may be configured to enable computing device 1100 to communicate with other another computing or network device across a network, such as via a wired connection, a wireless connection, or a combination of wired and wireless connections. For example, communication interfaces 1108 may include an Ethernet interface, an optical interface, a coaxial interface, an infrared interface, a radio frequency (RF) interface, a universal serial bus (USB) interface, a Wi-Fi interface, a cellular network interface, or the like.

Memory 1110 may be any computer-readable medium that participates in providing computer program instructions and data to processor(s) 1102 for execution, including without limitation, non-transitory computer-readable storage media (e.g., optical disks, magnetic disks, flash drives, etc.), or volatile media (e.g., SDRAM, ROM, etc.). Memory 1110 may include various instructions for implementing an operating system 1114 (e.g., Mac OS®, Windows®, Linux). The operating system 1114 may be multi-user, multiprocessing, multitasking, multithreading, real-time, and the like. The operating system 1114 may perform basic tasks, including but not limited to: recognizing inputs from input devices 1104; sending output to display device 1106; keeping track of files and directories on memory 1110; controlling peripheral devices (e.g., disk drives, printers, etc.) which can be controlled directly or through an I/O controller; and managing traffic on bus 1112. Bus 1112 may be any known internal or external bus technology, including but not limited to ISA, EISA, PCI, PCI Express, USB, Serial ATA or FireWire.

Network communications instructions 1116 may establish and maintain network connections (e.g., software applications for implementing communication protocols, such as TCP/IP, HTTP, Ethernet, telephony, etc.). Application(s) and program modules 1120 may include software application(s) and different functional program modules which are executed by processor(s) 1102 to implement the processes described herein and/or other processes. The program modules 1120 may include but not limited to software programs, machine learning models, objects, components, data structures that are configured to perform tasks or implement the processes described herein. The processes described herein may also be implemented in operating system 1114.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an server device or an Internet server, or that includes a front-end component, such as a user device having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and server devices. A user computing device and server may generally be remote from each other and may typically interact through a network. The relationship of user computing devices and server device may arise by virtue of computer programs running on the respective computers and having a client-server relationship to each other.

Communication between various network and computing devices 1100 of a computing system may be facilitated by one or more application programming interfaces (APIs). APIs of system may be proprietary and/or may be examples available to those of ordinary skill in the art such as Amazon® Web Services (AWS) APIs or the like. One or more steps or operations of the disclosed embodiments may be implemented using an API. An API may define one or more parameters that are passed between a calling application and other software code (e.g., an operating system, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

Conclusion

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A cascading model architecture method for providing information on a reply email from a prospect replying to a user, comprising:

creating training sample data using a user's incoming reply emails from external computer devices to a user's computer device;

preprocessing the training sample data of the reply emails, training a receptivity neural network model using the training sample data of the reply emails, and using a trained receptivity neural network model to determine a receptivity classification for whether new reply emails are positive reply emails or non-positive reply emails, the positive reply emails comprising the new reply emails indicating a prospect's willingness to continue discussions, and the non-positive reply emails comprising the new reply emails indicating a prospect's hesitancy to continue the discussions;

augmenting sample data of the non-positive reply emails, and training an objection identification neural network model on the augmented sample data of the non-positive reply emails using a trained objection identification neural network model to determine an objection classification for new non-positive reply emails, wherein augmenting the sample data of the non-positive reply emails comprises: for any given original reply email body, applying augmentation comprising: a paraphrasing model, a formal to casual transformation model, a casual to formal transformation model, or a back translation model, or any combination thereof;

providing identification and temporal preprocessing of a new reply email by: creating a person placeholder mask to hide names; creating a phone number placeholder mask to hide phone numbers; or creating a temporal information mask to hide temporal information; or any combination thereof;

providing body and signature preprocessing of the new reply email that has been identification and temporally preprocessed so that only an email with a body and a signature remain, wherein the body and signature preprocessing comprises:

extracting the body of the new reply email by removing an email thread from a plaintext reply email so that only a most recent part of the new reply email remains;

breaking the most recent part into paragraphs and sentences;

searching the paragraphs and the sentences for predetermined thread starter phrases and removing the paragraphs and the sentences that begin with the predetermined thread starter phrases;

separating the body from the signature of the new reply email by using an enhanced heuristic signature removal method by searching for a name of a reply email sender within text and assigning part of the new reply email at a location of the name as the signature; and using a machine learning method trained on the enhanced heuristic method to identify lines of the new reply email that comprise the signature;

using a trained receptivity model to determine if the new reply email is a positive reply email or a non-positive reply email;
using a trained objection identification model to classify the non-positive reply email, wherein the non-positive reply email is classified into a category comprising: timing objection, not the buyer objection, no interest objection, unsure, or other, or any combination thereof;
determining a confidence rating to indicate how likely it is that a classification for a classified non-positive reply email is correct, wherein the confidence rating comprises an upper probability threshold and a lower probability threshold; and
determining explainability information for a classified reply email to explain how the classified reply email was classified, wherein determining the explainability information comprises:
identifying common key words and key phrases within email reply samples that have been predicted to be in same class, wherein the common key words and key phrases are identified using dimensionality reduction applied to multiple hyper-parameter combinations of hierarchical density based clustering;
highlighting the key words and the key phrases when they appear in the new email reply; and
using the highlighted key words and the key phrases in the explainability information.

2. A cascading model architecture method for providing information on a reply email from a prospect replying to a user, comprising:
creating training sample data using a user's incoming reply emails from external computer devices to a user's computer device;
training a receptivity neural network model using the training sample data of the reply emails, and using a trained receptivity neural network model to determine a receptivity classification for whether new reply emails are positive reply emails or non-positive reply emails, the positive reply emails comprising the new reply emails indicating a prospect's willingness to continue discussions, and the non-positive reply emails comprising the new reply emails indicating a prospect's hesitancy to continue the discussions;
training an objection identification neural network model on augmented sample data of the non-positive reply emails found using the trained receptivity neural network model, wherein the trained objection identification neural network model is used to determine a objection classification for new non-positive reply emails; and
determining explainability information for a classified reply email to provide information key words and/or key phrases that were used by the trained receptivity neural network model and the trained objection identification neural network model to classify new positive reply emails and the new non-positive reply emails.

3. The method of claim 2, wherein the objection classification comprises: timing objection, not the buyer objection, no interest objection, unsure, or other, or any combination thereof.

4. The method of claim 2, further comprising preprocessing the training sample data of the reply emails, the preprocessing comprises:
creating a person placeholder mask to hide names;
creating a phone number placeholder mask to hide phone numbers; or
creating a temporal information mask to hide temporal information; or any combination thereof.

5. The method of claim 2, wherein determining the explainability information comprises:
identifying common key words and common key phrases within reply email samples that have been predicted to be in same class;
highlighting the common key words and the common key phrases when they appear in the new reply email; and
using highlighted common key words and highlighted common key phrases in the explainability information.

6. The method of claim 5, wherein the common key words and the common key phrases are identified using dimensionality reduction applied to multiple hyper-parameter combinations of hierarchical density based clustering.

7. The method of claim 2, comprising:
determining a confidence rating to indicate how likely it is that a classification for a classified non-positive reply email is correct.

8. The method of claim 7, wherein the confidence rating comprises an upper probability threshold and a lower probability threshold.

9. The method of claim 7, wherein the confidence rating is applied to a positive reply email and/or a non-positive reply email.

10. The method of claim 2, wherein the method uses a cascading architecture such that outputs of the receptivity neural network model are used as inputs in the objection identification neural network model when determining how to categorize a new reply email.

11. The method of claim 2, wherein the determining the explainability information is done for the positive reply emails and the non-positive reply emails.

12. The method of claim 2, further comprising preprocessing a reply email so that only an email with a most recent email body and a signature remain.

13. The method of claim 12, wherein determining the most recent email body comprises:
extracting only the body of the reply email by removing all email threads from a plaintext reply email so that only a most recent part of the reply email remains;
breaking the most recent part of the reply email into paragraphs and sentences;
searching the paragraphs and the sentences for predetermined thread starter phrases; and
removing the paragraphs and the sentences that begin with the predetermined thread starter phrases.

14. The method of claim 13, further comprising:
separating the body from the signature of the reply email, comprising:
using an enhanced heuristic signature removal method to search for a name of a reply email sender within text and assign a location of the name in the most recent part of the reply email as the signature; and
using a machine learning method trained on the enhanced heuristic signature removal method to identify lines of a new reply email that comprise the signature.

15. The method of claim 14, wherein if the name of the reply email sender is known, the lines of the reply email are searched for pre-defined name candidates, pre-defined nicknames candidates, or pre-defined diminutive candidates, or predefined initial candidates, or any combination thereof to determine if there is a match.

16. The method of claim 14, wherein if the name of the reply email sender is unknown, the name is found within the lines of the reply email by comparing potential name candidates with predetermined permutations of local-parts of a reply email sender's email address to determine if there is a match.

17. The method of claim 2, wherein augmenting the training sample data comprises: for any given original reply email body, applying: a paraphrasing model, a formal to casual transformation model, a casual to formal transformation model, or a back translation model, or any combination thereof.

18. The method of claim 17, wherein the back translation model comprises translating words from a first language into a second language, and then translating the words in the second language back into the first language.

19. The method of claim 18, wherein the back translation model comprises translating English into Russian or German, and then back from the Russian or the German into the English.

20. The method of claim 2, wherein training of the receptivity neural network model comprises a process that converges to a solution that stabilizes performance.

21. The method of claim 2, wherein training of the objection identification neural network model comprises a process that converges to a solution that stabilizes performance.

22. The method of claim 2, wherein an automated feedback loop is utilized for retraining the receptivity neural network model and/or the objection identification neural network model using user overwrites of the receptivity classification and/or the objection identification classification.

23. A cascading model architecture system for providing information on a reply email from a prospect replying to a user, comprising:
    a processor configured for:
        creating training sample data using a user's incoming reply emails from external computer devices to a user's computer device;
        training a receptivity neural network model using the training sample data of the reply emails, and using a trained receptivity neural network model to determine a receptivity classification for whether new reply emails are positive reply emails or non-positive reply emails, the positive reply emails comprising the new reply emails indicating a prospect's willingness to continue discussions, and the non-positive reply emails comprising the new reply emails indicating a prospect's hesitancy to continue the discussions;
        training an objection identification neural network model on augmented sample data of the non-positive reply emails found using the trained receptivity neural network model, wherein the trained objection identification neural network model is used to determine an objection classification for new non-positive reply emails; and
        determining explainability information for a classified reply email to provide information key words and/or key phrases that were used by the trained receptivity neural network model and the trained objection identification neural network model to classify new positive reply emails and the new non-positive reply emails.

24. The system of claim 23, wherein the objection classification comprises: timing objection, not the buyer objection, no interest objection, unsure, or other, or any combination thereof.

25. The system of claim 23, further comprising preprocessing the training sample data of the reply emails, the preprocessing comprises:
    creating a person placeholder mask to hide names;
    creating a phone number placeholder mask to hide phone numbers; or
    creating a temporal information mask to hide temporal information; or any combination thereof.

26. The system of claim 23, wherein determining the explainability information comprises:
    identifying common key words and common key phrases within reply email samples that have been predicted to be in same class;
    highlighting the common key words and the common key phrases when they appear in the new reply email; and
    using highlighted common key words and highlighted common key phrases in the explainability information.

27. The system of claim 26, wherein the common key words and the common key phrases are identified using dimensionality reduction applied to multiple hyper-parameter combinations of hierarchical density based clustering.

28. The system of claim 23, comprising:
    determining a confidence rating to indicate how likely it is that a classification for a classified non-positive reply email is correct.

29. The system of claim 28, wherein the confidence rating comprises an upper probability threshold and a lower probability threshold.

30. The system of claim 28, wherein the confidence rating is applied to a positive reply email and/or a non-positive reply email.

31. The system of claim 23, wherein the method uses a cascading architecture such that outputs of the receptivity neural network model are used as inputs in the objection identification neural network model when determining how to categorize a new reply email.

32. The system of claim 23, wherein the determining the explainability information is done for the positive reply emails and the non-positive reply emails.

33. The system of claim 23, further comprising preprocessing a reply email so that only an email with a most recent email body and a signature remain.

34. The system of claim 33, wherein determining the most recent email body comprises:
    extracting only the body of the reply email by removing all email threads from a plaintext reply email so that only a most recent part of the reply email remains;
    breaking the most recent part of the reply email into paragraphs and sentences;
    searching the paragraphs and the sentences for predetermined thread starter phrases; and removing the paragraphs and the sentences that begin with the predetermined thread starter phrases.

35. The system of claim 34, further comprising:
    separating the body from the signature of the reply email, comprising:
        using an enhanced heuristic signature removal method to search for a name of a reply email sender within text and assign a location of the name in the most recent part of the reply email as the signature; and
        using a machine learning method trained on the enhanced heuristic signature removal method to identify lines of a new reply email that comprise the signature.

36. The system of claim 35, wherein if the name of the reply email sender is known, the lines of the reply email are searched for pre-defined name candidates, pre-defined nicknames candidates, or pre-defined diminutive candidates, or predefined initial candidates, or any combination thereof to determine if there is a match.

37. The system of claim 35, wherein if the name of the reply email sender is unknown, the name is found within the lines of the reply email by comparing potential name candidates with predetermined permutations of local-parts of a reply email sender's email address to determine if there is a match.

38. The system of claim 23, wherein augmenting the training sample data comprises: for any given original reply email body, applying: a paraphrasing model, a formal to casual transformation model, a casual to formal transformation model, or a back translation model, or any combination thereof.

39. The system of claim 38, wherein the back translation model comprises translating words from a first language into a second language, and then translating the words in the second language back into the first language.

40. The system of claim 38, wherein the back translation model comprises translating English into Russian or German, and then back from the Russian or the German into the English.

41. The system of claim 23, wherein training of the receptivity neural network model comprises a process that converges to a solution that stabilizes performance.

42. The system of claim 23, wherein training of the objection identification neural network model comprises a process that converges to a solution that stabilizes performance.

43. The system of claim 23, wherein an automated feedback loop is utilized for retraining the receptivity neural network model and/or the objection identification neural network model using user overwrites of the receptivity classification and/or the objection identification classification.

44. A cascading model architecture system for providing information on a reply email from a prospect replying to a user, comprising a processor configured for:
creating training sample data using a user's incoming reply emails from external computer devices to a user's computer device;
preprocessing the training sample data of the reply emails, training a receptivity neural network model using the training sample data of the reply emails, and using a trained receptivity neural network model to determine a receptivity classification for whether new reply emails are positive reply emails or non-positive reply emails, the positive reply emails comprising the new reply emails indicating a prospect's willingness to continue discussions, and the non-positive reply emails comprising the new reply emails indicating a prospect's hesitancy to continue the discussions;
augmenting sample data of the non-positive reply emails, and training an objection identification neural network model on the augmented sample data of the non-positive reply emails using a trained objection identification neural network model to determine an objection classification for new non-positive reply emails, wherein augmenting the sample data of the non-positive reply emails comprises: for any given original reply email body, applying augmentation comprising: a paraphrasing model, a formal to casual transformation model, a casual to formal transformation model, or a back translation model, or any combination thereof;
providing identification and temporal preprocessing of a new reply email by: creating a person placeholder mask to hide names; creating a phone number placeholder mask to hide phone numbers; or creating a temporal information mask to hide temporal information; or any combination thereof;
providing body and signature preprocessing of the new reply email that has been identification and temporally preprocessed so that only an email with a body and a signature remain, wherein the body and signature preprocessing comprises:
extracting the body of the new reply email by removing an email thread from a plaintext reply email so that only a most recent part of the new reply email remains;
breaking the most recent part into paragraphs and sentences;
searching the paragraphs and the sentences for predetermined thread starter phrases and removing the paragraphs and the sentences that begin with the predetermined thread starter phrases;
separating the body from the signature of the new reply email by using an enhanced heuristic signature removal method by searching for a name of a reply email sender within text and assigning part of the new reply email at a location of the name as the signature; and
using a machine learning method trained on the enhanced heuristic method to identify lines of the new reply email that comprise the signature;
using a trained receptivity model to determine if the new reply email is a positive reply email or a non-positive reply email;
using a trained objection identification model to classify the non-positive reply email, wherein the non-positive reply email is classified into a category comprising: timing objection, not the buyer objection, no interest objection, unsure, or other, or any combination thereof;
determining a confidence rating to indicate how likely it is that a classification for a classified non-positive reply email is correct, wherein the confidence rating comprises an upper probability threshold and a lower probability threshold; and
determining explainability information for a classified reply email to explain how the classified reply email was classified, wherein determining the explainability information comprises:
identifying common key words and key phrases within email reply samples that have been predicted to be in same class, wherein the common key words and key phrases are identified using dimensionality reduction applied to multiple hyper-parameter combinations of hierarchical density based clustering;
highlighting the key words and the key phrases when they appear in the new email reply; and
using the highlighted key words and the key phrases in the explainability information.

* * * * *

UNITED STATES PATENT AND TRADEMARK OFFICE
CERTIFICATE OF CORRECTION

| | |
|---|---|
| PATENT NO. | : 11,586,878 B1 |
| APPLICATION NO. | : 17/548253 |
| DATED | : February 21, 2023 |
| INVENTOR(S) | : Alec Lionel Delany et al. |

It is certified that error appears in the above-identified patent and that said Letters Patent is hereby corrected as shown below:

On the Title Page

In ITEM (72) Inventors:
Change --Alec Lionel Delany, Atlanta, GA (US); Carlos Roman Salas, Long Beach, CA (US); Sneha Dey Subramanian, Atlanta, GA (US); Scott Hood Mitchel, Smyrna, GA (US); Michel Guillet, Alpharetta, GA (US)--

To --Alec Lionel Delany, Atlanta, GA (US); Carlos Roman Salas, Long Beach, CA (US); Tyler Joseph Howard, Decatur, GA (US); Sneha Dey Subramanian, Atlanta, GA (US); Scott Hood Mitchel, Smyrna, GA (US); Michel Guillet, Alpharetta, GA (US); Roi Israel Ceren, Sandy Springs, GA (US)--

Signed and Sealed this
Third Day of December, 2024

Katherine Kelly Vidal
*Director of the United States Patent and Trademark Office*